US008635058B2

(12) United States Patent
Patel

(10) Patent No.: US 8,635,058 B2
(45) Date of Patent: Jan. 21, 2014

(54) INCREASING THE RELEVANCY OF MEDIA CONTENT

(76) Inventor: Nilang Patel, Mableton, GA (US)

(*) Notice: Subject to any disclaimer, the term of this patent is extended or adjusted under 35 U.S.C. 154(b) by 826 days.

(21) Appl. No.: 12/716,170

(22) Filed: Mar. 2, 2010

(65) Prior Publication Data

US 2011/0218812 A1 Sep. 8, 2011

(51) Int. Cl.
*G06F 17/28* (2006.01)
*G06F 17/27* (2006.01)
*G06F 17/21* (2006.01)
*G10L 15/26* (2006.01)
*G10L 17/00* (2013.01)
*G10L 15/06* (2013.01)
*G10L 21/00* (2013.01)
*G10L 13/00* (2006.01)
*G10L 13/08* (2013.01)

(52) U.S. Cl.
USPC .............. 704/2; 704/3; 704/4; 704/9; 704/10; 704/235; 704/246; 704/243; 704/270; 704/270.1; 704/275; 704/260; 704/258

(58) Field of Classification Search
USPC ........... 704/2, 3, 4, 9, 10, 235, 246, 243, 270, 704/270.1, 275, 260, 258
See application file for complete search history.

(56) References Cited

U.S. PATENT DOCUMENTS

| | | | | |
|---|---|---|---|---|
| 5,701,497 A * | 12/1997 | Yamauchi et al. | ................ | 704/3 |
| 6,381,465 B1 * | 4/2002 | Chern et al. | .................. | 455/466 |
| 7,778,632 B2 * | 8/2010 | Kurlander et al. | ............ | 455/418 |
| 7,783,472 B2 * | 8/2010 | Nagao et al. | ..................... | 704/2 |
| 8,290,273 B2 * | 10/2012 | Prasad et al. | ................. | 382/181 |
| 2001/0032070 A1 * | 10/2001 | Teicher | ............................. | 704/2 |
| 2002/0087525 A1 * | 7/2002 | Abbott et al. | ..................... | 707/3 |
| 2002/0193983 A1 * | 12/2002 | Tokieda et al. | .................... | 704/2 |
| 2003/0154476 A1 * | 8/2003 | Abbott et al. | .................. | 725/37 |
| 2003/0163300 A1 * | 8/2003 | Kasvand et al. | ................. | 704/2 |
| 2006/0206305 A1 * | 9/2006 | Kimura et al. | .................... | 704/2 |
| 2006/0210198 A1 * | 9/2006 | Suenaga et al. | ............. | 382/321 |
| 2006/0286527 A1 * | 12/2006 | Morel | ....................... | 434/307 R |
| 2007/0099602 A1 * | 5/2007 | Kurlander et al. | ............ | 455/418 |
| 2008/0005053 A1 * | 1/2008 | Pulsipher | ....................... | 706/45 |
| 2008/0233980 A1 * | 9/2008 | Englund et al. | .............. | 455/466 |
| 2008/0243501 A1 * | 10/2008 | Hafsteinsson et al. | ........ | 704/235 |
| 2009/0048821 A1 * | 2/2009 | Yam et al. | ......................... | 704/3 |
| 2009/0171653 A1 * | 7/2009 | Hecht et al. | ...................... | 704/3 |
| 2009/0198486 A1 * | 8/2009 | Chang | ................................ | 704/2 |
| 2009/0243998 A1 * | 10/2009 | Wang | ............................ | 345/156 |
| 2010/0153321 A1 * | 6/2010 | Savvides et al. | ................ | 706/13 |
| 2010/0222102 A1 * | 9/2010 | Rodriguez | .................... | 455/557 |
| 2010/0241418 A1 * | 9/2010 | Maeda et al. | ..................... | 704/9 |
| 2010/0299138 A1 * | 11/2010 | Kim | ................................ | 704/9 |
| 2011/0122448 A1 * | 5/2011 | Minhas | ....................... | 358/1.18 |

* cited by examiner

Primary Examiner — Edgar Guerra-Erazo

(57) ABSTRACT

The present invention relates to increasing the relevance of media content communicated to consumers who are consuming the media content. In this regard, at least one of a personal device can be synced with a media device, each of the personal device is associated with at least one of a consumer who is proximate the media device. At least one of a preferred human language associated with at least one of the personal device can be determined. The media device or media content can be configured and or caused to be communicated in at least one of the preferred human language to increase relevance of the media content communicated to the consumer. Other embodiments can include communicating at least a portion of the media content on the personal device and selecting relevant media content based in part on language, cultural, ethnic, time, day, occasion, or geography.

26 Claims, 9 Drawing Sheets

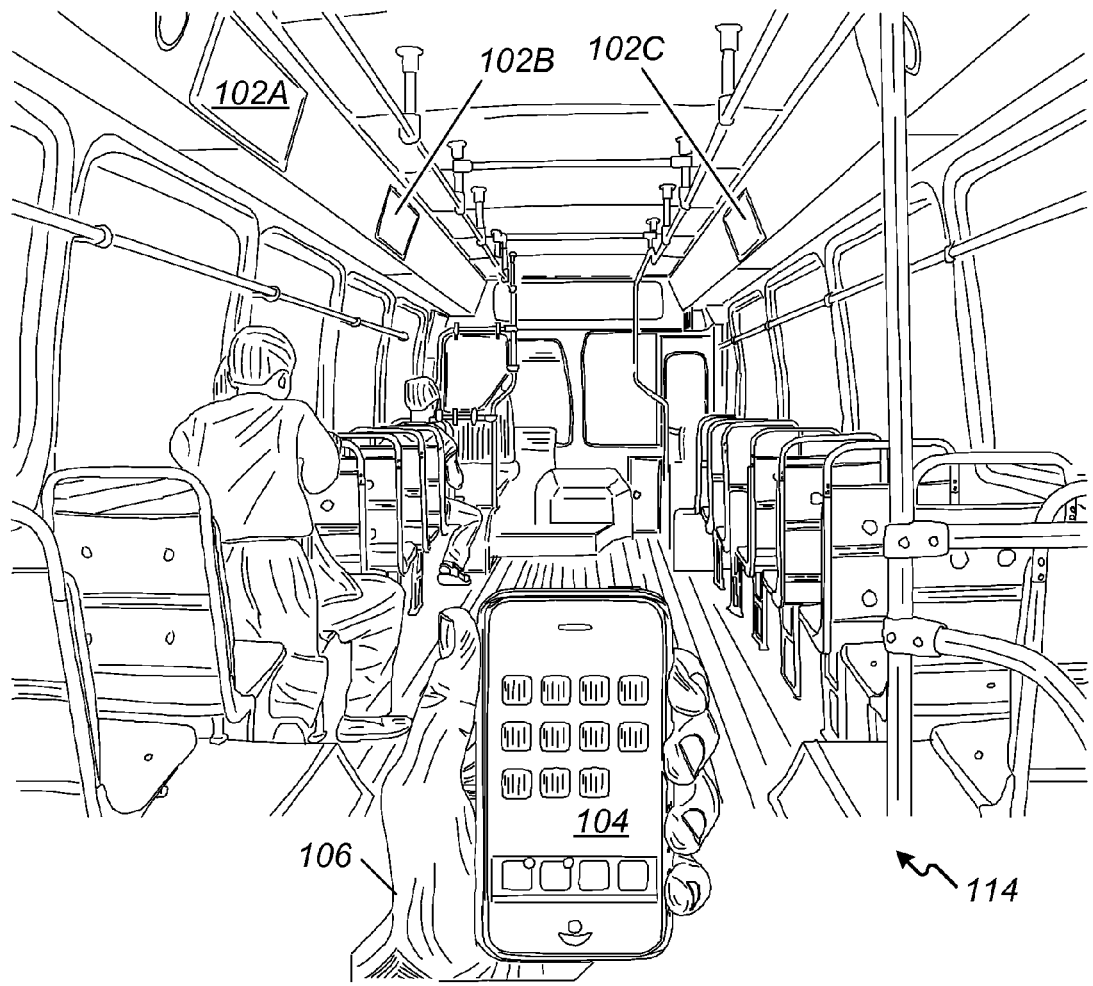
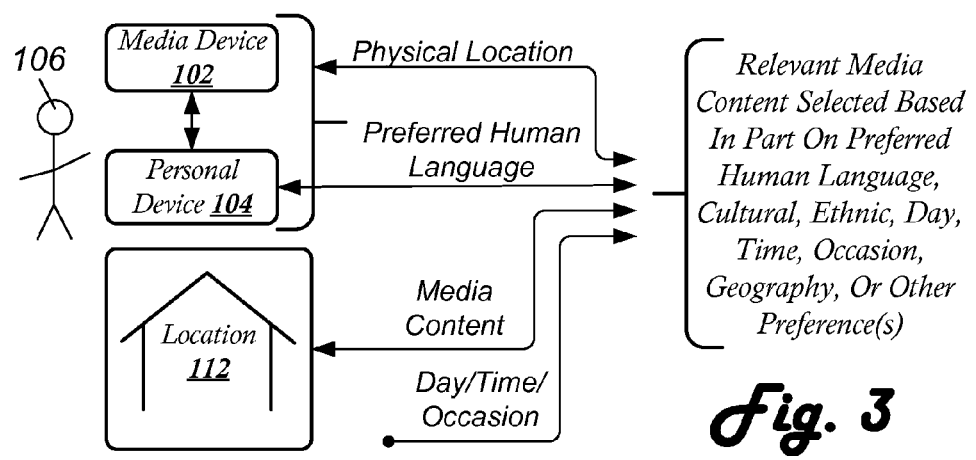
Fig. 3

INCREASING THE RELEVANCY OF MEDIA CONTENT

TECHNICAL FIELD OF THE INVENTION

This invention relates to increasing the relevance of media content communicated to consumers who are consuming the media content, and particularly to syncing at least one of a personal device with a media device, each of the personal device is associated with at least one of a consumer who is proximate the media device. Determining at least one of a preferred human language associated with at least one of the personal device, and configuring or causing the media device or media content associated with the media device to be communicated in at least one of the preferred human language to increase relevance of the media content communicated to the consumer.

BACKGROUND OF THE INVENTION

Before our invention billboards, advertisement displays, and information displays were widely utilized. Such media displays are often presented to consumer to impart information such as illustrating a subway map and schedules, or to advertise a product.

A shortcoming of such information and advertising displays can be that they are not necessarily presented to a consumer in a language that the consumer understands. For example, in the subway consumers continually arrive and depart. In the traveling population many languages can be spoken; however the displays and signage around the subway station are typically in a single local language. As such, many of the consumers passing through the subway station may not be able to read or understand the information and advertisement signage. As such, the inability to communicate to consumers in their familiar language makes the information and advertisements less relevant, as many consumers just may not understand the messaging.

Another shortcoming can be that the information presented or advertised is just not relevant or appealing to a consumer. In this regard, consumers that don't speak or understand the local language can often find that the information or advertisements are culturally misaligned with their needs. As such, much information and advertisement may not meet the cultural or ethnic needs of consumers that do converse in the local language. Furthermore, traveling consumers not familiar with the local geographical area may not know how to access information that is culturally or ethnically relevant to them.

Another shortcoming can be an inability to match consumer preferences to relevant informational and advertising content. In this regard, in a public venue or on public transportation the informational and advertisement displays do not take into consideration the various languages, cultural and ethnic preferences, nor do they take into consideration the geographically relevant types and kind of information and advertisements that would increase the relevance to the consumer. Instead such displays are often static, or display a fixed rotation of information and advertisements. The displays often impart nothing in the way of try to better relate the informational or advertising content to the unique preferences of the various consumers who are proximate the informational and advertisement displays.

Another shortcoming can be that even if the information or advertisement is something the consumer is interested in, there is little if anyway for the consumer to interact with the information or advertisement to learn more or act on a sales impulse. Furthermore, there can be little in the way of being able to transfer information to the consumer so that the consumer can interact with the informational or advertising content in a different format at a later location or time, which may be more convenient to the consumer.

For these reasons and shortcomings as well as other reasons and shortcomings there is a long felt need that gives rise to the present invention.

SUMMARY OF THE INVENTION

The shortcomings of the prior art are overcome and additional advantages are provided through the provision of a method of increasing the relevance of a media content communicated to consumers who are consuming the media content. The method comprising syncing at least one of a personal device with a media device, each of the personal device is associated with at least one of a consumer who is proximate the media device; determining at least one of a preferred human language associated with at least one of the personal device; and configuring the media device or the media content associated with the media device to be communicated in at least one of the preferred human language to increase relevance of the media content communicated to the consumer.

Additional shortcomings of the prior art are overcome and additional advantages are provided through the provision of a method of increasing the relevance of a media content communicated to consumers who are consuming the media content. The method comprising allowing a plurality of personal devices to sync with a media device, the plurality of personal devices being associated with a plurality of consumers proximate the media device; analyzing a plurality of preferred human languages associated with the plurality of personal devices to determine at least one of an optimum preferred human language; and causing the media device or the media content associated with the media device to communicate to at least one of the plurality of consumers in at least one of the optimum preferred human language.

Additional shortcomings of the prior art are overcome and additional advantages are provided through the provision of a method of increasing the relevance of a media content communicated to consumers who are consuming the media content. The method comprising syncing a personal device with a media device, the personal device is associated with a consumer proximate the media device; determining a preferred human language associated with the personal device; and communicating at least portion of audio or video of the media content in the preferred human language on the media device, wherein communicating the media content in the preferred human language increases relevance of the media content with the consumer.

Additional shortcomings of the prior art are overcome and additional advantages are provided through the provision of a method of increasing the relevance of a media content communicated to consumers who are consuming the media content. The method comprising determining a physical location of a media device; determining at least one of a preferred human language of at least one of a plurality of consumers proximate the media device; determining at least one of a relevant media content at least based on the physical location of the media device; and causing the relevant media content to be communicated to at least one of the plurality of consumers, by way of the media device, in at least one of the preferred human language.

Additional shortcomings of the prior art are overcome and additional advantages are provided through the provision of a method of increasing the relevance of a media content communicated to consumers who are consuming the media content. The method comprising communicating the media content on a media device at a media content charge rate of non-premium; syncing a personal device with the media device; and communicating the media content on the media device when synced with the personal device at the media content charge rate of premium.

Additional shortcomings of the prior art are overcome and additional advantages are provided through the provision of a personal device for increasing the relevance of a media content communicated to consumers who are consuming the media content. The personal device comprising a means for syncing with at least one of a media device, the personal device is associated with at least one of a consumer who is proximate the media device; and a computer readable medium encoded with instructions for causing wirelessly a preferred human language preference to be communicated, by way of the means for syncing, to the media device, wherein the media device or the media content associated with the media device is configured or caused to be communicated in the preferred human language to increase relevance of the media content communicated to the consumer.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates one example of a personal device syncing with a media device and communication of relevant media content selected based in part on preferred human language, cultural, ethnic, day, time, occasion, geography, or other preferences;

FIG. 4 illustrates one example of a personal device syncing with a media device and communication of menu or services messaging on a media device in a restaurant, retail establishment, or the like.

The detailed description explains the preferred embodiments of the invention, together with advantages and features, by way of example with reference to the drawings.

DETAILED DESCRIPTION OF THE INVENTION

Figure 1:
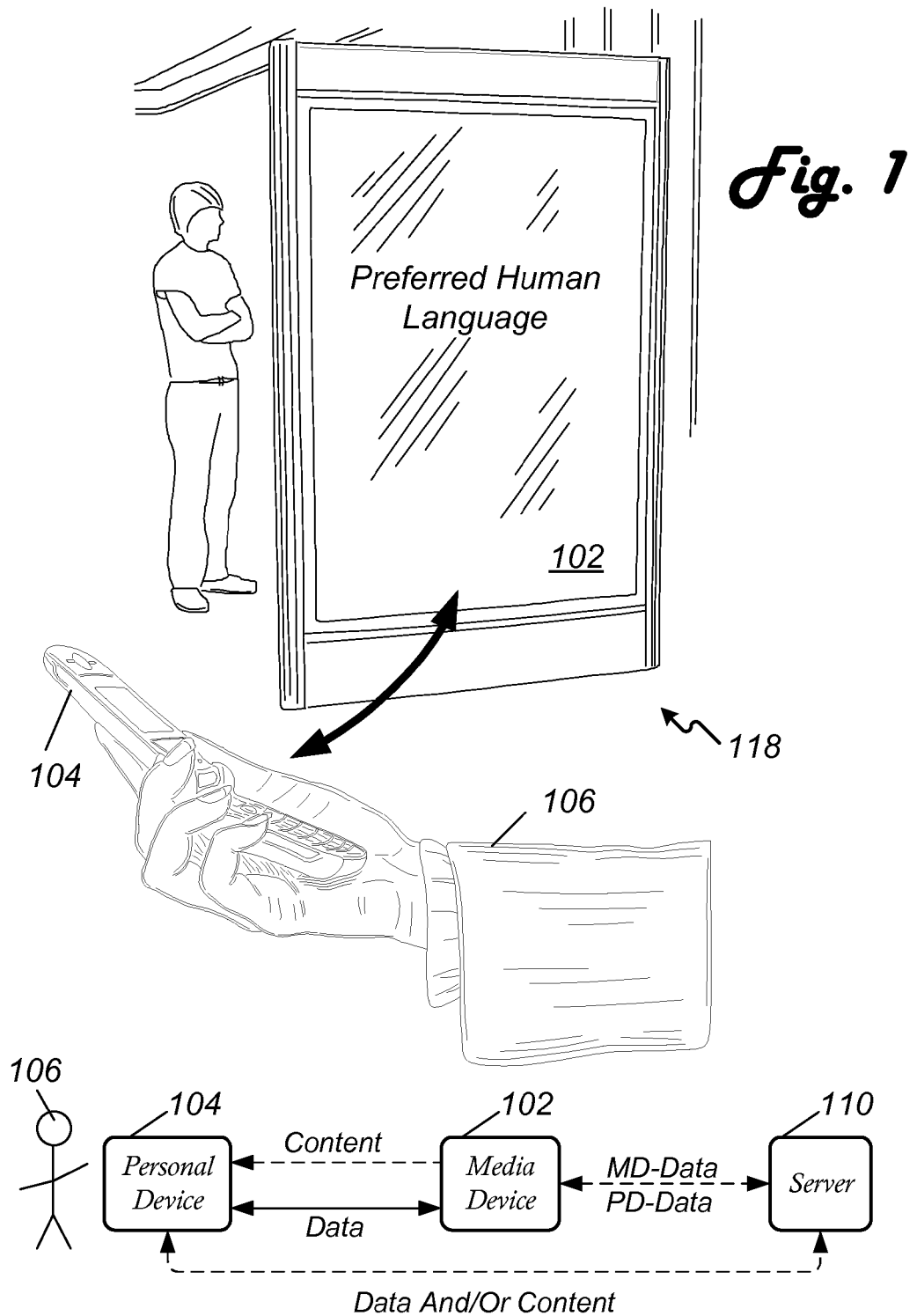
FIG. 1 illustrates one example of a media device communicating a media content in a preferred human language.

Turning now to the drawings in greater detail, it will be seen that in FIG. 1 there is illustrated one example of media device 102 communicating media content in a preferred human language. In an exemplary embodiment, such media content can be communicated in a private or public location 118. For example and not a limitation, in an airport, a train station, a bus depot, a shopping mall, or other types and kinds of locations 118, as may be required and or desired in a particular embodiment.

A personal device 104 can sync with media device 102. Such syncing can allow data communication including preferences to be exchanged between the personal device 104 and the media device 102 (shown as solid line communication path labeled Data in FIG. 1). A consumer 106 can be associated with the personal device 104 and such preferences exchanged can be consumer preferences stored in, or accessible to, the personal device 104. Furthermore, such preferences can cause the media device 102 or the media content associated with the media device 102 to be communicated to the consumer based in part on the consumer's preferences. In this regard, communicating based in part of the preferences of the consumer 106 associated with the personal device 104, such as preferred human language, increases the relevance of media content communicated to the consumer 106.

Such a personal device 104 can be a wireless phone, APPLE, ATT, SPRINT, VERIZON, GOOGLE, LG, MOTOROLA, AMAZON, and or other wireless communication devices including IPHONE, IPOD, ANDROID, IPAD, KINDLE, as well as other wireless communication devices, 3G/4G communication device, personal computers (PC), laptop computers, and or other type and kinds of personal devices, as may be required and or desired in a particular embodiment.

Such a media device 102 can be an electronic outdoor billboard sign, an indoor electronic advertisement screen, changeable printed displays operable by a electromechanical sign changing mechanism, light emitting diode (LED) displays, liquid crystal displays (LCD), electro luminous (EL) displays, plasma displays, displays configured to operate with a computing platform, a personal computer based system, a server based system, run or operate an operating system (OS) such as Linux/MICROSOFT/or other OS and run or operate firmware/software such as JAVA/FLASH/SHOCKWAVE/or similar software and or other firmware/software, be a network accessible displays, displays having media content storage, mechanical displays having a plurality of changeable displays or views, computer monitors, televisions, flat screen displays, and or other types and kinds of media devices, as may be required and or desired in a particular embodiment. Furthermore, such a media device 102 can, as may be required and or desired in a particular embodiment, data communicate with personal devices 104, servers 110, and communicate at least a portion of the media content being communicated on the media device 102, in such a way, as to allow personal devices 104, in-vehicle media systems, and or other types and kinds of devices to receive, consumer 106 to interact, communicate, optionally store, and or otherwise receive and or allow consumer 106 interaction with at least a portion of the media content.

For purposes of disclosure human language can be defined as including written language, spoken language, and or otherwise include visually presented text, indicia, and or audible media formats, as may be desired and or required in a particular embodiment. Furthermore, interacting with media content, by way of personal device 104, an in-vehicle device 108, or other device and can include ordering, purchasing, requesting information, or transacting other types and kinds of interactions and or ecommerce, as may be required and or desired in a particular embodiment.

In an exemplary embodiment, a personal device 104 associated with a consumer 106 can sync with media device 102. Syncing a personal device 104 with a media device 102 can be by way of data communication with the media device 102, by way of a server 110 that has data communication access to the media device 102, and or by way of other methods, as may be required and or desired in a particular embodiment. Such data communication between a personal device 104 and a media device 102 can be by way of BLUETOOTH, 3G/4G, wireless local area network (LAN), wireless wide area network (WAN), 802.11, WI-FI, WIMAX, RF type (for example and not a limitation amplitude modulated AM, frequency modulated FM, spread spectrum, 300 Khz-1 Ghz, 2.4 Ghz, 5.6 Ghz, or other frequency), infrared, pico nets, or other similar wireless communication, universal serial bus (USB) devices, TCP/IP based, or by way of other types and kinds of data communication, as may be required and or desired in a particular embodiment.

Such a server 110 can be a data processing resource, an IBM, HP, DELL, GATEWAY, personal computer (PC), Linux based computing platform, MICROSOFT based computing platform, operating system based computing platform, laptop computer, network device, internet accessible data processing resource, a plurality of servers operating as a system, and or other types and kinds of servers, as may be required and or desired in a particular embodiment. Furthermore, data communications between the media device 102, personal device 104, and server 110 can be wired, wireless, internet based, intranet based, local network, wide area network, and or other types and kinds of data communications, as may be required and or desired in a particular embodiment. In addition, the internet can be referred to as a global network, and server 110 can be a global network based data processing resource.

In an exemplary embodiment, the personal device 104 can sync with a media device 102. The personal device 104, is associated with a consumer 106 and can provide or otherwise reference consumer preference information, such as a preferred human language of the consumer 106 and or other preferences. The media device 102 or the media content to be communicated on the media device 102, can then be caused and or configured such that the media content communicated to the consumer 106 is in the consumer's preferred human language.

As example and not a limitation, a consumer 106 with personal device 104 can be proximate the media device 102. The personal device 104 syncs with the media device 102 and data communicates or otherwise references the consumer's preferred human language, in this embodiment, in German. The media device 102 or the media content to be communicated on the media device 102 can be configured to communicate the media content, in this embodiment, German. Such media content can be, for example, a subway map, train schedule, advertisement, or other media content in which case the language on the media content and or audio associated with the media content changes to, in this embodiment, German so that the consumer 106 can interact with the media content and or hear information related to the media content in the consumer's preferred human language.

In another exemplary embodiment, for example and not a limitation, the media device 102 can be located in a shopping mall and the media content can be an advertisement or other media content. The consumer's personal device 104 syncs with media device 102 and a preferred human language is determined by way of the personal device 104. If the consumer's preferred human language, in this embodiment, is Hebrew, for example, then the advertisement or other media content can be communicated to the consumer, in this embodiment, in Hebrew.

Media content can include audio, video, static images, indicia, and or other types and kind of media content, as may be required and or desired in a particular embodiment. Furthermore, media content can be configured as needed and in near real time or stored at the media device 102 of server 110 and retrieved as needed.

In embodiments where the media content is configured in near real time, such configuring can be effectuated by way of the media device 102 or at a server 110. In this regard, if Spanish is desired the media content can be configured for the Spanish language audio, video, indicia, and or other types and kinds of configurations, as may be required in a particular embodiment. Such media content configuration can be effectuated at the media device 102 or at a server 110 that is in data communication access with the media device 102.

An advantage of these types of embodiments, where the media content is configured in near real time, can be that the media content is generated and or customized based on the consumer 106 preferences and then communicated to the consumer by way of the media device 102, server 110, and or by way of the personal device 104. As such, since the media content is dynamically generated and then communicated to the consumer more versions, formats, and or other variation and configurations of the media content can be supported and made available, appealing to an even broader audiences of consumers.

Alternatively, the media content can be configured to include all available languages and or other options, from which the preferred configuration can be selected or configured. In these types of embodiments, the media content can be resident in the media device 102 or data communicated to the media device 102 with no further changes to the media content necessary. In these types of embodiments the media device 102 can then be configured to communicate in a desired preferred human language, or configured in other ways, selected from the available languages and options, but does not require the media content to be changed, reformatted, or otherwise altered.

As an example and not a limitation, media content could be resident in a media device 102. The media content could have been developed to support a fixed number of different languages in both text and audio formats. A consumer 106 with preferred human language preference of French, in this embodiment, syncs a personal device 104 with the media device 102. The media device 102 selects the French version of the media content, which is already stored in the media device 102 and communicates the media content by way of display, text, indicia, audio, or other available formats to the consumer, as may be required and or desired in a particular embodiment.

An advantage of these types non near real time configured, fixed format type, of embodiments is that media content can be generated once comprising all the various languages, formats and or other options and then the media device 102 or a server 110 can communicate the standard, fixed format type media content to the media device 102. The media device 102 can optionally store and through configurations select or otherwise cause the correct preferred human language audio, video, text, indicia, and other options and preferences to be communicated to the consumer 106.

In another exemplary embodiment, for example and not a limitation a consumer can sync a personal device 104 with a media device 102. In determining the preferred human language, an additional preference can be to have the media content communicated in an audio mode, visual mode, and or transferred to the personal device 104 in a magnify mode, coupon mode, privacy mode, or other types or kinds of mode, as may be required and or desired in a particular embodiment. In this regard, in and exemplary embodiment, a consumer with a disability can use the system to obtain the media content in a manner that overcomes their disability. In another embodiment, a consumer can obtain marketing information such as product information, coupons, and or other information on their personal device 104. In yet another embodiment a consumer can get media content on their personal device 104 that can be reviewed privately.

For example and not a limitation, in a disability mode, if the consumer 106 is visually impaired the media content can be communicated in an audio mode so the consumer 106 can hear instead of having to view the media content. If the consumer 106 is visual impaired requiring magnified viewing of larger print, the media content can be communicated to the personal device 104 and the personal device 104 can serve as a magnifying device to enlarge the visual content so that the consumer 106 can view and or read more easily.

If for example and not a limitation, the consumer 106 is hearing impaired then the personal preference could be to view the content instead of hearing the media content. As such, the media content could display for viewing any text (closed captioning) from any audio portion associated with the media content to overcome the hearing impairment.

In an exemplary embodiment, for example and not a limitation, the personal device 104 can comprise the human language preference and other preferences. In this regard, when the personal device syncs with the media device 102 the preferences can be data communicated between the personal device 104 and the media device 102. FIG. 1 illustrates such a data flow. In a first alternative embodiment, the personal device 104 can data communicate with a server 110 that has data communication access with both the media device 102 and the personal device 104. In a second alternative embodiment, data including preference data, illustrated as personal device 104 data (PD-Data) in FIG. 1 (shown as an alternative dotted line communication path) can be data communicated by way of the media device 102 between the personal device 104 and the server 110.

As such, depending on the communication embodiment employed, the personal device 104 preference data can be directly communicated with the media device 102 or indirectly communicated with the media device 102. Furthermore, the consumer's preferences can reside on the personal device 104 and or on the remote server 110. In embodiments where preferences are not resident on the personal device 104, the personal device 104 can cause preferences and other data and or configuration data to be communicated with the media device 102, as may be required and or desired in a particular embodiment.

In another exemplary embodiment, for example and not a limitation, the media device 102 can data communicate with the server 110, illustrated as media device 102 data (MD-Data) (shown as an alternative dotted line communication path). Such MD-Data communication can include communicating data about the media device 102 such as physical location, metrics of utilization that can be used to determine media content viewing and interaction statistics, to effectuate interaction between the personal device 104, media device 102 and or media content, to charge fees for services, non-premium and premium charge rates for communicating the media content, and or other fees, to send or receive media content, to communicate media content references and or to receive the requested media content, and or for other purposes, as may be required and or desired in a particular embodiment.

In another exemplary embodiment, the media device 102 can optionally data communicate content to the personal device 104 or content can optionally be data communicated from the server 110 to the personal device 104 (shown as alternative dot line communication paths). In this regard, for example and not a limitation, the consumer 106 can decide to receive audio, video, text, and or other media content on the personal device 104. In this regard, the media content can be communicated from the media device 102 and or the server 110, as may be required and or desired in a particular embodiment.

For example, the consumer 106 can sync the personal device 104 with the media device 102. Preferences, in this embodiment, for the French language can be exchanged as well as preferences to receive the media content audio on the personal device 104. In this regard, media device 102 can display information in French as well as provide the consumer an opportunity to listen to audio or interact with at least a portion of the media content on the personal device 104.

In another exemplary embodiment, for example and not a limitation, should the consumer decide to interact with the media content, such interaction could cause data to be communicated between the personal device 104, media device 102, and or server 110 by way of the media device 102 as PD-Data or directly to the server 110 (shown as alternative dotted line communication paths). In response to such interaction data, at least a portion of the media content can be communicated to the personal device 104 by way of the media device 102 and or by way of the server 110. For purposes of disclosure content and media content can also be referred to as data and data can be referred to as media content and or content.

Figure 2:
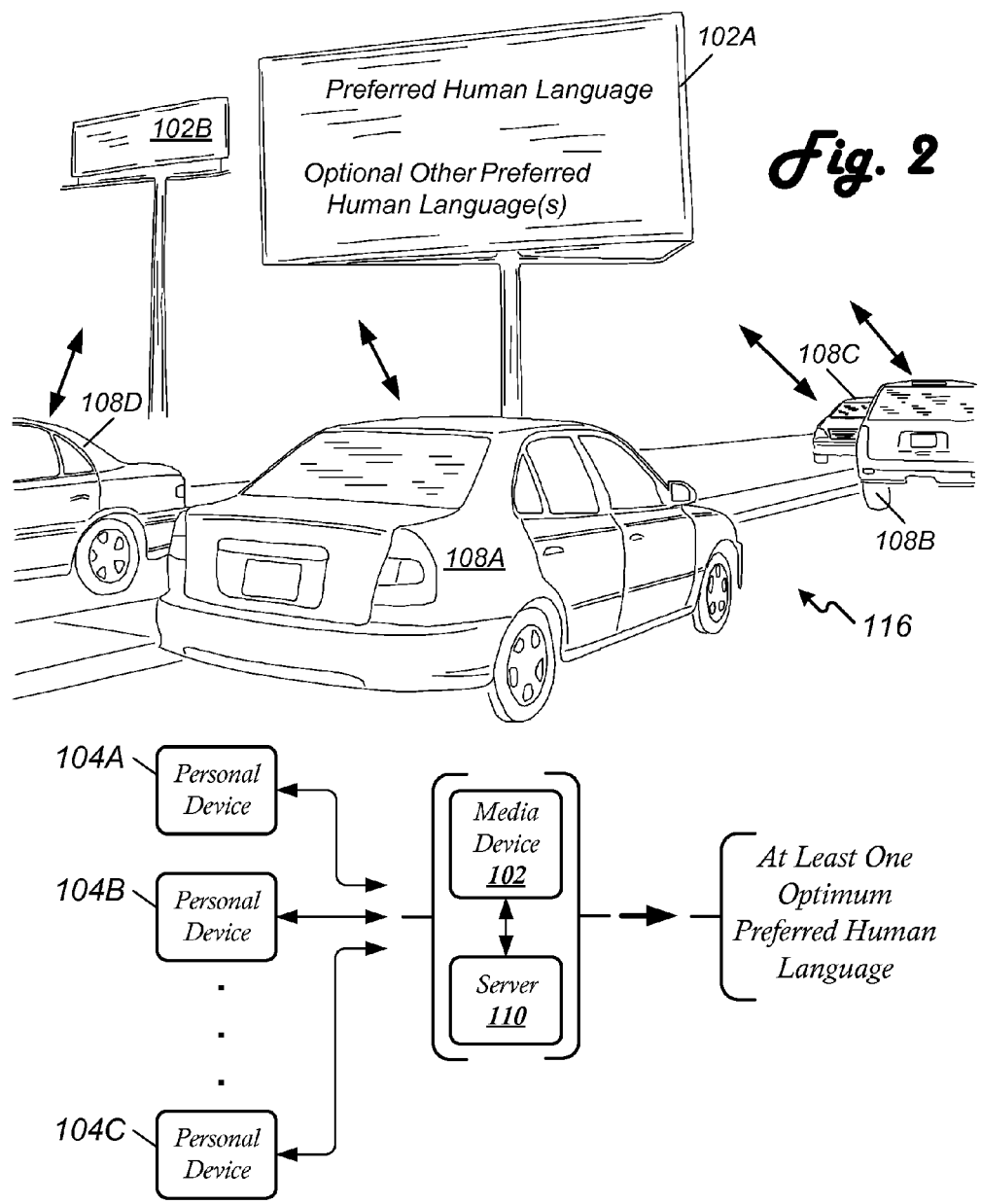
FIG. 2 illustrates one example of a plurality of personal devices syncing with a media device and media content communicated in at least one of an optimum preferred human language.

Referring to FIG. 2 there is illustrated one example of a plurality of personal devices syncing with a media device 102 and media content communicated in at least one of an optimum preferred human language. In an exemplary embodiment, in the context of private or public signage in venues 116, a plurality of personal devices 104A-C can sync with media devices 102A-B, to increase the relevance of media content communicated to consumers who are consuming the media content. The media devices 102A-B, for example, can be located as roadside billboards, store signage, restaurants, shopping centers venue signs, or other types and kinds of signage or venues 116, as may be required and or desired in a particular embodiment.

Such personal devices 104A-C syncing can be with the media devices 102A or 102B directly or by way of a server 110, that has data communication access with the media device 102. The plurality of personal devices 104A-C can exchange a plurality of human language preferences and or other data and preferences with the media device 102 or server 110. The media device 102 and or the server 110 can then analyze the plurality of preferred human languages associated with the plurality of the personal devices 104A-C to determine at least one of an optimum preferred human language.

In this regard, for example and not a limitation, if a majority of personal devices 104A-C indicate that the consumers associated with the personal devices 104A-C optimum preferred human language is, in this embodiment, Spanish, such determination coming through analysis of the plurality of preferred human languages associated with the plurality of the personal devices 102A-C, then the media device 102A and or 102B and or media content communicated on the media devices 102A and or 102B can be configured for Spanish communication.

In another exemplary embodiment, should Spanish and French be determined through analysis of the plurality of preferred human languages associated with the plurality of the personal devices 104A-C, then the media devices 102A and or 102B and or the media content communicated on the media devices 102A and or 102B can be configured for Spanish and French communication. In the context of communicating to consumers who are consuming the media content, in the environment of private or public signage or venues 116, such visual media content communication in a variety of optimum preferred human languages can be by way of text, indicia, receiving audio broadcast on a personal device 104, on an in-vehicle media system 108A-D, such as a radio, satellite system or other system, or on other device, and or other communication methods, as may be required and or desired in a particular embodiment.

In this regard, in an exemplary embodiment, for example and not a limitation, at least a portion of the media content can be received on an in-vehicle 108A-D media system. For example, a consumer 106 can tune a radio and receive audio associated with the media content being communicated on the media device 102, by way of an in-vehicle media system 108A-D. Furthermore, there may be several audio options available such that if the consumer 106 tunes the radio to a first frequency they can hear a first preferred human language, and if the consumer 106 tunes the radio to a subsequent frequency then the consumer can hear the media content audio in subsequent preferred human languages.

In another exemplary embodiment, when the personal device 104 is proximate more than one media device 102, such that the personal device 104 can sync with more than one media device 102, the signal strength or other proximity measurement methods between the personal device 104 and the plurality of media devices 102 can be measured. Such measurements can determine which of the plurality of media devices 102 is closest to the personal device 104. Once determined, the personal device 104 can sync with the closest media device 102. Furthermore, as the personal device 104 moves and a different media device 102 becomes the closest media device 102 to the personal device 104, as can be measured with signal strength or other proximity measurement methods, the sync with the further prior media device 102 can be terminated and the personal device 104 can sync with the now closer media device 102. In this regard, the personal device 104 can sync with the closest media device 102 changing to subsequent media devices 102 as the personal device 104 or the media device 102 moves, changing locations. In such an exemplary embodiment, for example and not a limitation, in areas having a plurality of media devices 102 such as roadways, restaurants, houses, and or other areas, the personal device 104 can sync with the closest media device 102, in lieu of syncing with all proximate media devices 102, including those media devices 102 that are not necessarily the closest to the personal device 104.

For purposes of disclosure, media device 102A-B can be referred to as media device 102 and personal device 104A-C can also be referred to as personal device 104. In addition, for purposes of disclosure there can be any number of a plurality of personal devices 104 and any number of media devices 102. The illustration in FIG. 2 is an exemplary embodiment and not a limitation and does not imply a specific number of personal devices 104 or media devices 102 that can be utilized.

Referring to FIG. 3 there is illustrated one example of a personal device 104 syncing with a media device 102 and communication of relevant media content selected based in part on preferred human language, cultural, ethnic, day, time, occasion, geography, or other preferences.

In an exemplary embodiment, in a private or public transportation vehicle 114, a personal device 104 can sync with media device 102A-C. Such transportation vehicles 114 can include for example trains, buses, airplanes, taxis, or other types and kinds of transportation vehicles, as may be required and or desired in a particular embodiment.

In an exemplary embodiment, the physical location of media device 102 and or the personal device 104 can be communicated to remote server 110, and or otherwise used locally by the media device 102 or personal device 104 to aid in the selection of relevant media content based in part on the geographical location of the transportation vehicle 114.

In an embodiment where the physical location of the media device 102 is communicated to a remote server 110, such a communication can be effectuated by way of the media device 102 directly communicating wired or wirelessly with the remote server 110, or the media device 102 can communicate indirectly with the remote server 110, by way of syncing with the personal device 104 and then communicating, by way of the personal device 104, with the remote server 110.

In an embodiment where preferred human language preferences are utilized in determining relevant media content, the personal device 104 and or the media device 102 synced with the personal device 104 can communicate consumer language and or other preferences to a remote server 110, or otherwise use language preferences and or other preferences locally by the media device 102 or personal device 104 to select relevant media content.

In an exemplary embodiment, such language preferences and or other preferences can be utilized in part to determine cultural preferences or ethnic preferences of the consumer 106. Such cultural and or ethnic preferences can then be utilized in the determination of relevant media content. As an example, a human language preference could be used to determine, in this embodiment, a Spanish cultural and or ethnic preference and then such preferences can be utilized in part to select relevant media content. Furthermore, such language, cultural, and or ethnic preferences, or other preferences can be combined with the physical location of the media device 102 and or the personal device 104 to select and communicate media content that is relevant to the consumer 106 preferences as well as geographically relevant to the location of the transportation vehicle 114.

In another exemplary embodiment, in such relevant media content embodiments that include being geographically relevant, media content that includes reference to a location 112 can be selected when the transportation vehicle 114 is physically located in proximity to the transportation vehicle 114. The media content referencing the location 112 can also be communicated to the consumer in the consumer's human language of preference. Furthermore, the media content referencing location 112 can be selected from a plurality of media content based in part on a determination of cultural or ethnic preferences.

Such a location 112 can be a place of business, an area such as downtown, a county, a state, or other areas, a chain of businesses such as HOME DEPOT, MCDONALDS, or other chains of business, and or other types and kinds of locations, as may be required and or desired in a particular embodiment.

As an example, if the media content referencing location 112 is an advertisement for an Italian restaurant, such media content could be selected and communicated to a consumer 106 whose language preference, when the personal device 104 syncs with the media device 102, is determined to be Italian and the transportation vehicle 114 is proximate the location 112.

As another example, if when the personal device 104 syncs with the media device 102 the language preference, in this embodiment, is German, German cultural and ethnic newscasts, advertisements, video articles, and or other German relevant media content can be selected. Such relevant media can then be communicated to the consumer in the preferred language of German and organized for communication and or selected based in part on the geographical proximity of a plurality of locations 112 to the transportation vehicle 114.

In an exemplary embodiment, the day of the week, the time of the day, or the occasion in which the consumer 106 is viewing the media content can be used to select and or determine which of a plurality of media content is relevant for communication to a consumer 106. In this regard, an occasion can be defined as a certain circumstance, time, juncture, or opportunity the consumer finds him or herself in. The occasion can also be defined as the environment or state of the consumer. Such occasions can include amusement, recreation, relaxation, physical endurance, family, work, travel, on-the-go, and or other types and kinds of occasions, as may be required and or desired in a particular embodiment. As an example and not a limitation, amusement occasions can be amusement parks, game centers, sporting events and the like. Physical performance occasions can be gyms, workout areas, and the like. Family occasions can be locations in which family events take place such as parties, celebrations, dining, hiking, picnics, sightseeing and the like. On-the-go occasions can be the travel consumers make when transitioning from one event to another, like changing classes in school, traveling between work and home, transitioning between meetings and the like.

In a plurality of exemplary embodiments, the physical location of the media device 102 and or of the personal device 104 can be utilized with the preferred human language preference and other preferences to select relevant media content. In addition, media content can also be selected based in part on location 112 information, day of week, time of day, consumer occasion, and or other elements or parameters, as may be required and or desired in a particular embodiment. Furthermore, additional criteria such as cultural, ethnic, and other preferences can also be utilized, determined, and or otherwise analyzed, along with other parameters to, in part, further identify relevant media content.

Figure 4:
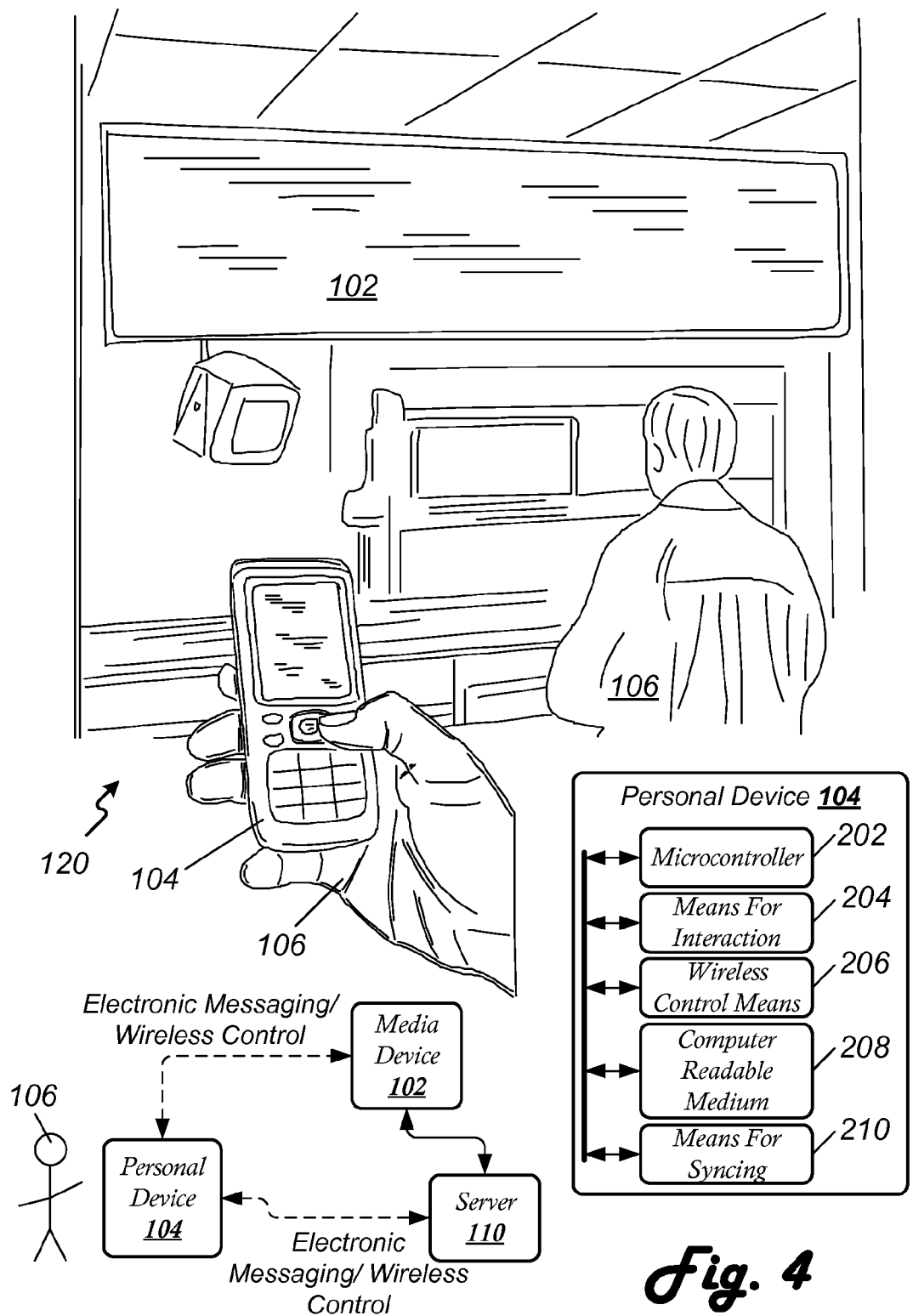

Referring to FIG. 4 there is illustrated one example of a personal device 104 syncing with a media device 102 and communication of menu or services messaging on a media device in a restaurant, retail establishment, or the like. In an exemplary embodiment, in a restaurant, or retail establishment a consumer can use a personal device 104 to change the language on a media device 102, wherein the media device 102 is configured as a menu or services messaging board. Such restaurant or retail establishment can be referred to as establishment 120.

In an exemplary embodiment, a consumer 106 can send an electronic message to the media device or a server 110 in data communication access with the media device 102. Such an electronic message can be a short message service (SMS), email, http, and or other types and kinds of electronic message, as may be required and or desired in a particular embodiment. The electronic message can comprise a preferred language preference. Upon receipt of the consumer's human language preference at the media device 102, the media device 102 can change the language of the menu or services messaging board to the consumer's preferred language.

As an example and not a limitation, a consumer 106 in line at a MCDONALD'S restaurant can text or otherwise send an electronic message to the media device 102, which is configured as a menu or services messaging board. The electronic message can comprise the consumer's language preference. As example, in this embodiment, a consumer preferred language can be French. Upon receipt of the electronic message at the media device 102, which is configured as a menu or services messaging board, the language can be changed to French, so that the consumer 106 can better understand the menu or services messaging.

In an exemplary embodiment, the personal device 104 when synced with the media device 102 and can act as a pointing and selection device, such as is provided by a personal computer mouse. In this regard, the consumer 106 can move the personal device to control a cursor, make selections, and influence other aspects of control with the media content, as may be required and or desired in a particular embodiment. Such aspects of control can allow, for example and not a limitation, allowing the consumer 106 to place an order by pointing and selecting from the media device 102 menu or service board. In another example the consumer can interact with the media device, using the personal device 104 as a pointing and selection device, to 'surf' the media content, place orders, requests for information, provide consumer information, explore the media content, drill down to other aspects of the media content, send an electronic message, or perform other aspects of control with the media content, as consumers often can perform on an internet based website. Furthermore, in another exemplary embodiment for example and not a limitation, the personal device 104 can be used as a pointing device for entertainment, or to enable the consumer to play a video game on the media device 102 or interact with the media device 102 in an entertainment manner. Such entertainment activities can include online gaming, wherein the consumer can interact with other consumers in other locations.

FIG. 4 also illustrates data communication path for electronic messaging and wireless control between optionally the personal device 104 and the media device 102, or alternatively between a personal device 104 and a server 110, wherein the server 110 has data communication access with the media device 102.

In an exemplary embodiment, a personal device 104 can be a microcomputer based system. Such microcomputer 202 can be INTEL, AMD, ZILOG, MOTOROLA, SANYO, SAMSUNG, and or other types and kinds of microcomputers, as may be required and or desired in a particular embodiment. The microcomputer 202 can be operationally related to a computer readable medium 208. Such computer readable medium 208 can be flash memory, random or dynamic access memory, SD CARDS, USB DEVICES, FLASH DRIVES, hard drives, CDROM, DVD, BLU-RAY, memory sticks, and or other types and kinds of computer readable, as may be required and or desired in a particular embodiment.

In an exemplary embodiment, a computer readable medium 208 can be encoded with instructions for effectuating the methods of the present invention, as well as other methods, as may be required and or desired in a particular embodiment. In this regard, for example a computer readable medium 208 can be encoded with instructions for causing wirelessly a preferred human language preference to be communicated to the media device, wherein the media device or the media content associated with the media device is configured or caused to be communicated in the preferred human language to increase relevance of the media content communicated to the consumer. In another embodiment, for example, the computer readable medium can be encoded with instructions for using a wireless control means to perform data entry on the media device 102, and controlling interaction with media content associated with the media device 102. In another exemplary embodiment, for example, the computer readable medium 208 can be encoded with instructions for receiving and displaying at least a portion of the media content on the personal device 104, and allowing the consumer 106 to interact with at least a portion of the media content on the personal device 104.

In an exemplary embodiment, the personal device 104 can also comprise a means for interaction 204 with at least a portion of the media content. The means for interaction 204 can be operationally related to the microcontroller 202. In this regard, the computer readable medium 208 can be encoded with instructions for receiving and displaying at least a portion of the media content on the personal device 104, and engendering the consumer to interact with at least a portion of the media content on the personal device. Such a means for interaction 204 with at least a portion of the media content can include displays, audio, buttons, keypads, touch sensors, and video technology, earphones and other listening devices, computer readable medium storage, microcontroller data processing capabilities, wireless data communication, and or other types and kinds of means for media content interaction, as may be required and or desired in a particular embodiment.

In an exemplary embodiment, the personal device 104 can comprise a wireless control means 206 operationally related to the microcontroller 202. Such wireless control means 206 can comprise accelerometers and gyro scopes to determine motion and position, as well as other devices and methods to determine motion and position. Furthermore, such personal device 104 comprising a wireless control means 206 can implement buttons, keypads, and wireless communication devices, methods and technologies, as well as other types and kinds of wireless control means, as may be required and or desired in a particular embodiment. In addition, in an exemplary embodiment, syncing a personal device can be effectuated by way of a wireless control means which can implement the types and kinds of wireless devices, protocols, and technologies referenced herein, as well as can be implement with other types and kinds of wireless control means, as may be required and or desired in a particular embodiment.

In an exemplary embodiment, the personal device 104 can comprise a wireless control means 206 and a computer readable medium 208 encoded with instructions for using the wireless control means 206 to perform data entry on the media device 102, and controlling interaction with media content associated with the media device 102. In this regard, the personal device 104 can be used as a pointing and selection device to control and enable the consumer to interact with the media content that is associated with the media device 102.

Also in an exemplary embodiment, a personal device 104 can be synced with a media device 102 by way of a means for syncing 210. Syncing a personal device 104 with a media device 102 can be by way of data communication with the media device 102, by way of a server 110 that has data communication access to the media device 102, or by way of other methods, as may be required and or desired in a particular embodiment. Such means for syncing 210 can be operationally related to the microcontroller 202 and comprise wireless communication devices and firmware/software implemented stacks and protocols, as well as other devices, methods, and firmware/software, including those disclosed herein, as well as other types and kinds of means for syncing, as may be required and or desired in a particular embodiment. Such means for syncing 210 effectuates the ability for the personal devices 104 and the media devices 102 to data communicate.

Figure 5:
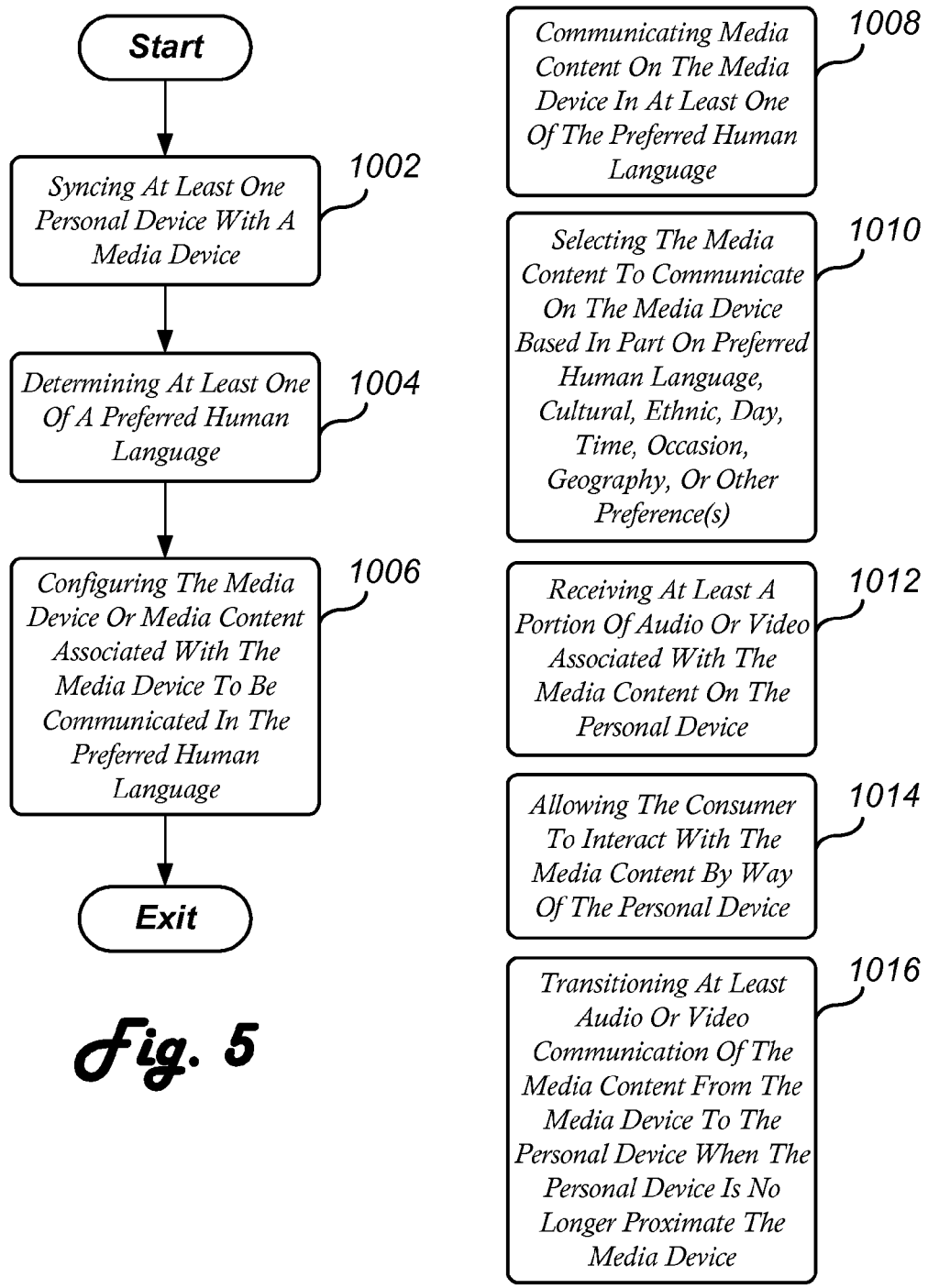
FIG. 5-9 illustrates examples of a method of increasing the relevance of media content communicated to consumers who are consuming the media content.

Referring to FIG. 5 there is illustrated one example of a method of increasing the relevance of media content communicated to consumers who are consuming the media content. In an exemplary embodiment, at least one of a personal device 104 can be synced with a media device 102. At least one of a human language preference can be determined, and then the media device 102 or the media content associated with the media device 102 can be configured to communicate the media content in the preferred human language. The method begins in block 1002.

In block 1002 at least one of a personal device 104 can be synced with a media device 102. Syncing a personal device 104 with a media device 102 can be by way of data communication with the media device 102, by way of a server 110 that has data communication access to the media device 102, or by way of other methods, as may be required and or desired in a particular embodiment. The method continues in block 1004.

In block 1004 at least one of a preferred human language can be determined. In this regard, the personal device 104, being associated with a consumer 106 can provide or otherwise reference consumer preference information, such as the preferred human language of the consumer 106.

Such, personal device 104 preference data can be directly communicated between the personal device 104 and the media device 102. Alternatively, such preference data can be indirectly communicated with the media device 102. With regards to indirect data communications, the consumer's preferences may reside on a data processing resource other then the personal device 104, but the personal device 104 can cause the preferences to be communicated with the media device 102, as may be required and or desired in a particular embodiment. The method continues in block 1006.

In block 1006 the media device 102 or media content associated with the media device 102 is configured to be communicated to the consumer 106 in the preferred human language. Such media content can be, for example, a subway map, shopping mall advertisement, roadside billboard, advertising content in a transportation vehicle, or other media content, as may be required and or desired in a particular embodiment.

In an exemplary embodiment, the preferred human language could be Japanese. The media device 102 or the media content associated with the media device 102 can be configured to communicate the media content in Japanese. Since the media content is in the preferred language of the consumer 106, the relevance of the media content communicated to consumer is increased. The method is then exited.

Referring to FIG. 5 there are also illustrated exemplary embodiments of a method of increasing the relevance of media content communicated to consumers who are consuming the media content. Such exemplary embodiments can be selectively utilized with the methods of the present invention.

In block 1008 the media content can be communicated, on the media device 102, in at least one of the preferred human languages. In certain exemplary embodiments, the media content can be communicated on the media device 102 in at least one of the preferred human languages. In exemplary embodiments, the media content can also be communicated in more than one of the preferred human languages. Such can be the case, for example and not a limitation, when the media content or the media device 102 communicating the media content is configured to communicate in a fixed or default human language such as English and then selectively a second human language to be determined and communicated based in part on the plurality of personal devices 104 preferences that may be proximate at any given time to the media device 102. In another exemplary embodiment, more than one personal device 104 proximate the media device 102 can cause the media content to be communicated in more than one preferred human language, as may be required and or desired in a particular embodiment.

In block 1010 the media content to be communicated on the media device 102 can be selected based in part on the physical location of the media device 102 and or of the personal device 104, the preferred human language preference and or other preferences. In addition, media content can also be selected based in part on location 112 information, day of week, time of day, consumer occasion, and or other elements or parameters, as may be required and or desired in a particular embodiment. Furthermore, additional criteria such as cultural, ethnic, and other preferences can also be utilized, determined, and or analyzed, along with other parameters to, in part, further identify relevant media content.

In block 1012 at least a portion of the media content audio, video, text, indicia, or other portions of the media content can be received on the personal device, in-vehicle media system 108, or other devices, as may be required and or desired in a particular embodiment. In this regard, the consumer 106 can enjoy viewing or listening to at least a portion of the media content on the personal device 104, in-vehicle on a media system 108, or on other devices.

In block 1014 the consumer can interact with the media content by way of the personal device 104. In an exemplary embodiment, for example and not a limitation, should the consumer decide to interact with the media content such interaction could cause data to be communicated between the personal device 104, media device 102, and or server 110 by way of the media device 102, as personal device 104 data (PD-Data), as illustrated in FIG. 1 or directly to the server 110. In response to such interaction data, media and data content can be communicated to the personal device 104 by way of the media device 102 and or by way of the server 110.

In an exemplary embodiment, the personal device can comprise a means for interacting with at least a portion of the media content and the computer readable medium encoded with instructions for receiving and displaying at least a portion of the media content on the personal device, and engendering the consumer to interact with at least a portion of the media content on the personal device. In this regard, the consumer 106 can receive and interact with the media content by way of the personal device 104. Such consumer 106 interaction with media content by way of personal device 104, an in-vehicle device 108, or other device and can include ordering, purchasing, requesting information, or transacting other types and kinds of interaction and or ecommerce, as may be required and or desired in a particular embodiment.

In block 1016 at least audio, video, text, indicia, or other portions of the media content can be transitioned from the media device 102 to the personal device 104 when the personal device 104 is no longer proximate the media device 102. In this regard, as the consumer with the personal device 104 moves away from and or out of range of the media device 102, at least a portion of the media content can be redirected to the consumer's personal device 104 so that the consumer can continue to consume and or interact with the media content.

Furthermore, when the consumer returns the personal device 104 back to being proximate the media device 102 the media content can be transitioned or otherwise redirected from or discontinued from communication on the personal device 104. In this regard, when the consumer moves back in range of the media device 102 communication of the media content can transition back to the media device 102.

Figure 6:
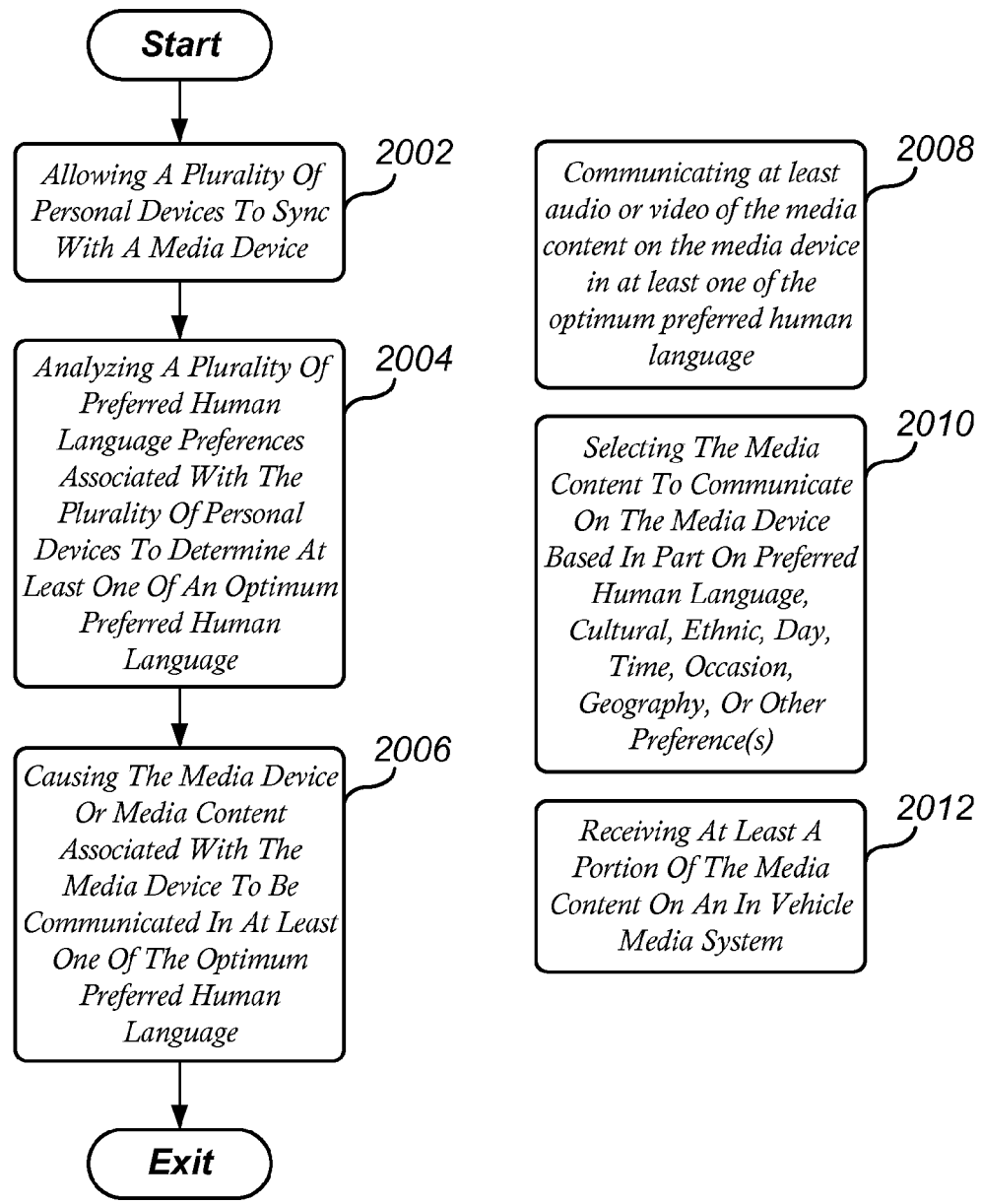

Referring to FIG. 6 there is illustrated one example of a method of increasing the relevance of media content communicated to consumers who are consuming the media content. In an exemplary embodiment, a plurality of personal devices 104 can sync with a media device 102. A plurality of preferred human language preferences can be analyzed to determine at least one of an optimum preferred human language. By way of determining at least one of an optimum human language preference the media device 102 or media content associated with the media device 102 can be communicated to at least one of the consumers, in at least one of the determined optimum preferred human languages. The method begins in block 2002.

In block 2002 a plurality of personal device 104 can sync with a media device 102. Syncing a personal device 104 with a media device 102 can be by way of data communication with the media device 102, by way of a server 110 that has data communication access to the media device 102, or by way of other methods, as may be required and or desired in a particular embodiment. The method continues in block 2004.

In block 2004 a plurality of preferred human language preferences associated with the plurality of personal devices 104 are analyzed to determine at least one of an optimum human language preference. Such analysis can be selecting the most common preference of the various preferred human languages preferences being analyzed, selection based on one or more most popular occurring preferred language preferences continually updated as personal devices 104 move in and out of proximity of the media device 102, and or by way of other types and kinds of analysis, as may be required and or desired in a particular embodiment.

In this regard, for example and not a limitation, if a majority of the plurality of personal devices 104 indicate that the consumers optimum preferred human language, in this embodiment, is Spanish, determined through analysis of the plurality of preferred human languages associated with the plurality of the personal devices 104, then the media device 102 or media content communicated on the media device 102 can be configured for Spanish communication.

In another exemplary embodiment, should Spanish and French be determined through analysis of the plurality of preferred human languages associated with the plurality of the personal devices 104, then the media device 102 and or the media content communicated on the media device 102 can be configured for Spanish and French communication. The method continues in block 2006.

In block 2006 the media device 102 or the media content associated with the media device 102 is caused to be communicated to at least one of the plurality of consumers, in at least one of the optimum preferred human languages. In this regard, the personal device 104 interaction, by way of syncing with the media device 102 or a server 110 in data communication access with the media device 102, causes the media device 102 or media content associated with the media device 102 to be communicated to at least one of the consumers consuming the media content, in at least one of the determined optimum preferred human languages. The method is then exited.

Referring to FIG. 6 there are also illustrated exemplary embodiments of a method of increasing the relevance of media content communicated to consumers who are consuming the media content. Such exemplary embodiments can be selectively utilized with the methods of the present invention.

In block 2008 the media content can be communicated on at least the media device 102 in at least one of the optimum preferred human languages. In exemplary embodiments, the media content can also be communicated in more than one of the preferred human languages and communicated on the personal device 104 as well, as may be required and or desired in a particular embodiment. Such can be the case, for example and not a limitation, when the media content or the media device 102 communicating the media content is configured to communicate in a fixed or default human language such as English and then selectively a second human language to be determined and communicated based in part on the plurality of personal devices 104 preferences that may be proximate, at any given time, to the media device 102.

In block 2010 the media content to be communicated on the media device 102 can be selected based in part on the physical location of the media device 102 and or of the personal device 104, the preferred human language preference and other preferences. In addition, media content can also be selected based in part on location 112 information, day of week, time of day, consumer occasion, and or other elements or parameters, as may be required and or desired in a particular embodiment. Furthermore, additional criteria such as cultural, ethnic, and other preferences can also be utilized, determined, and or analyzed, along with other parameters to, in part, further identify relevant media content.

In block 2012 at least a portion of the media content can be received on an in-vehicle media system 108. In this regard, for example and not a limitation, a consumer 106 can tune a media system, such as a radio, and receive audio associated with the media device 102 by way of the in-vehicle media system 108. Furthermore, there may be several audio options available such that if the consumer 106 tunes the radio to a first frequency they can hear in a first preferred human language, and if the consumer 106 tunes the media system to a subsequent frequency then the consumer can hear the media content audio in subsequent preferred human languages.

Figure 7:
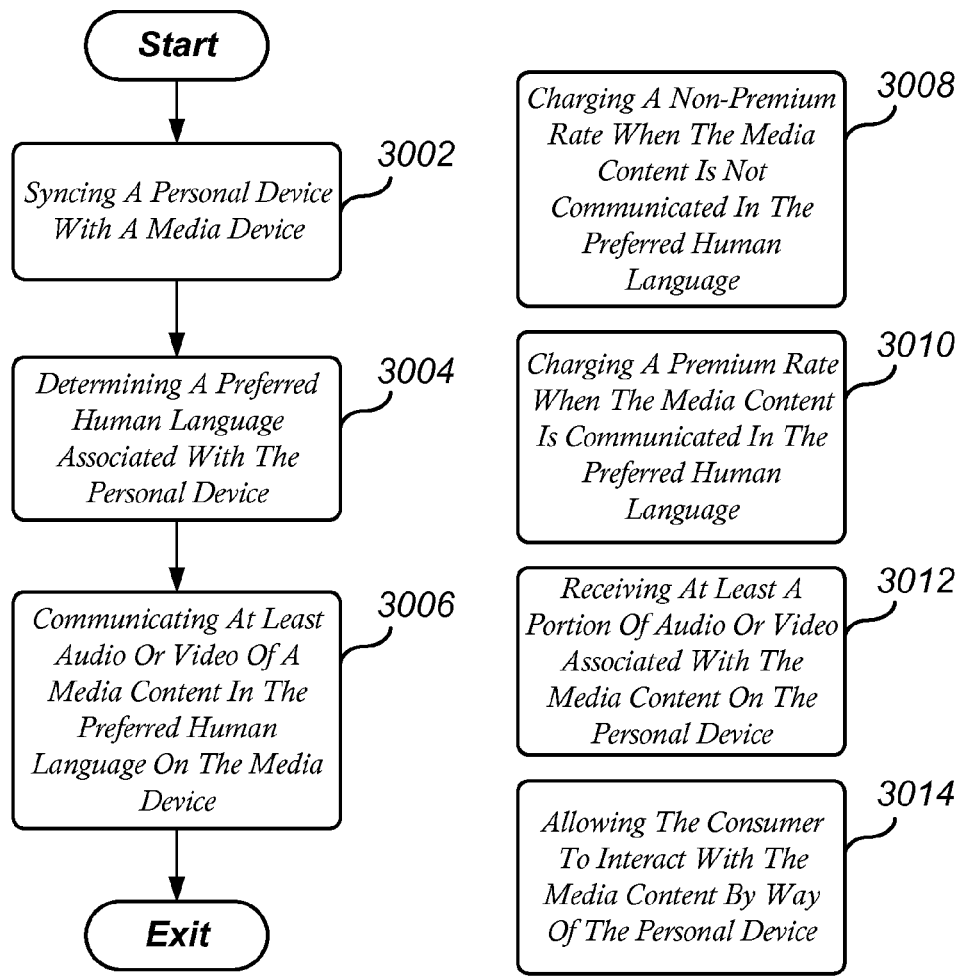

Referring to FIG. 7 there is illustrated one example of a method of increasing the relevance of media content communicated to consumers who are consuming the media content. In an exemplary embodiment, a personal device 104 can sync with a media device 102. A preferred human language associated with the personal device 104 can be determined. At least a portion of the audio, video, text, indicia or other portions of the media content can be communicated in the preferred human language on the media device 102. The method begins in block 3002.

In block 3002 a personal device 104 syncs with a media device 102. Syncing a personal device 104 with a media device 102 can be by way of data communication with the media device 102, by way of a server 110 that has data communication access to the media device 102, or by way of other methods, as may be required and or desired in a particular embodiment. The method continues in block 3004.

In block 3004 a preferred human language associated with the personal device 104 is determined. In this regard, the personal device 104, being associated with a consumer 106 can provide or otherwise reference consumer preference information such as a preferred human language of the consumer 106. As such, personal device 104 preference data can be directly communicated with the media device 102. Alternatively, such preferences can be indirectly communicated by way of a server 110 to the media device 102. The method continues in block 3006.

In block 3006 the media content can be communicated on the media device 102 in at least one of the preferred human languages. In exemplary embodiments, the media content can also be communicated in more than one of the preferred human languages. Such can be the case, for example and not a limitation, when the media content or the media device 102 communicating the media content is configured to communicate in a fixed or default human language such as English and then selectively a second human language to be determined and communicated based in part on the plurality of personal devices 104 preferences that may be proximate at any given time to the media device 102. The method is then exited.

Referring to FIG. 7 there are also illustrated exemplary embodiments of a method of increasing the relevance of media content communicated to consumers who are consuming the media content. Such exemplary embodiments can be selectively utilized with the methods of the present invention.

In block 3008 a non-premium rate can be charged when the media content is not communicated in the preferred human language. In an exemplary embodiment, for example and not a limitation, when a personal device 104 is not synced with a media device 102 an advertisement or other media content can be communicated on the media device 102. Since no personal device 104 is synced with the media device 102 and a preferred human language has not been determined the rate charged to the entity paying for the media content to be communicated on the media device 102 is a non-premium rate. A non-premium rate being less than a premium rate.

In block 3010 a premium rate can be charged when the media content is communicated in the preferred human language. In this embodiment, since a personal device 104 is synced with the media device 102 and the media content is being communicated in a preferred human language the media content is more relevant to the consumer 106 who is associated with the personal device 104 and as such a premium is charged to the entity paying for the media content to be communicated on the media device 102, personal device 104, or other devices.

In block 3012 at least a portion of the media content audio, video, text, indicia, or other portions of the media content can be received on the personal device 104, in-vehicle media system 108, or other devices, as may be required and or desired in a particular embodiment. In this regard, the consumer 106 can enjoy viewing or listening to at least a portion of the media content on the personal device 104, in-vehicle on a media system 108, or on other devices.

In block 3014 the consumer can interact with the media content by way of the personal device 104. In an exemplary embodiment, for example and not a limitation, should the consumer decide to interact with the media content such interaction could cause data to be communicated between the personal device 104, media device 102, and or server 110 by way of the media device 102 as personal device 104 data (PD-Data), as illustrated in FIG. 1 or directly to the server 110. In response to such interaction data and or media content can be communicated to the personal device 104 by way of the media device 102 and or by way of the server 110.

In an exemplary embodiment, the personal device 104 can comprise a means for interacting with at least a portion of the media content and the computer readable medium 208 encoded with instructions for receiving and displaying at least a portion of the media content on the personal device 104, and engendering the consumer to interact with at least a portion of the media content on the personal device 104. In this regard, the consumer 106 can receive and interact with the media content by way of the personal device 104. Such consumer 106 interaction with media content by way of personal device 104, an in-vehicle device 108 or other device and can include ordering, purchasing, requesting information, or transacting other types and kinds of interaction and or ecommerce, as may be required and or desired in a particular embodiment.

Figure 8:
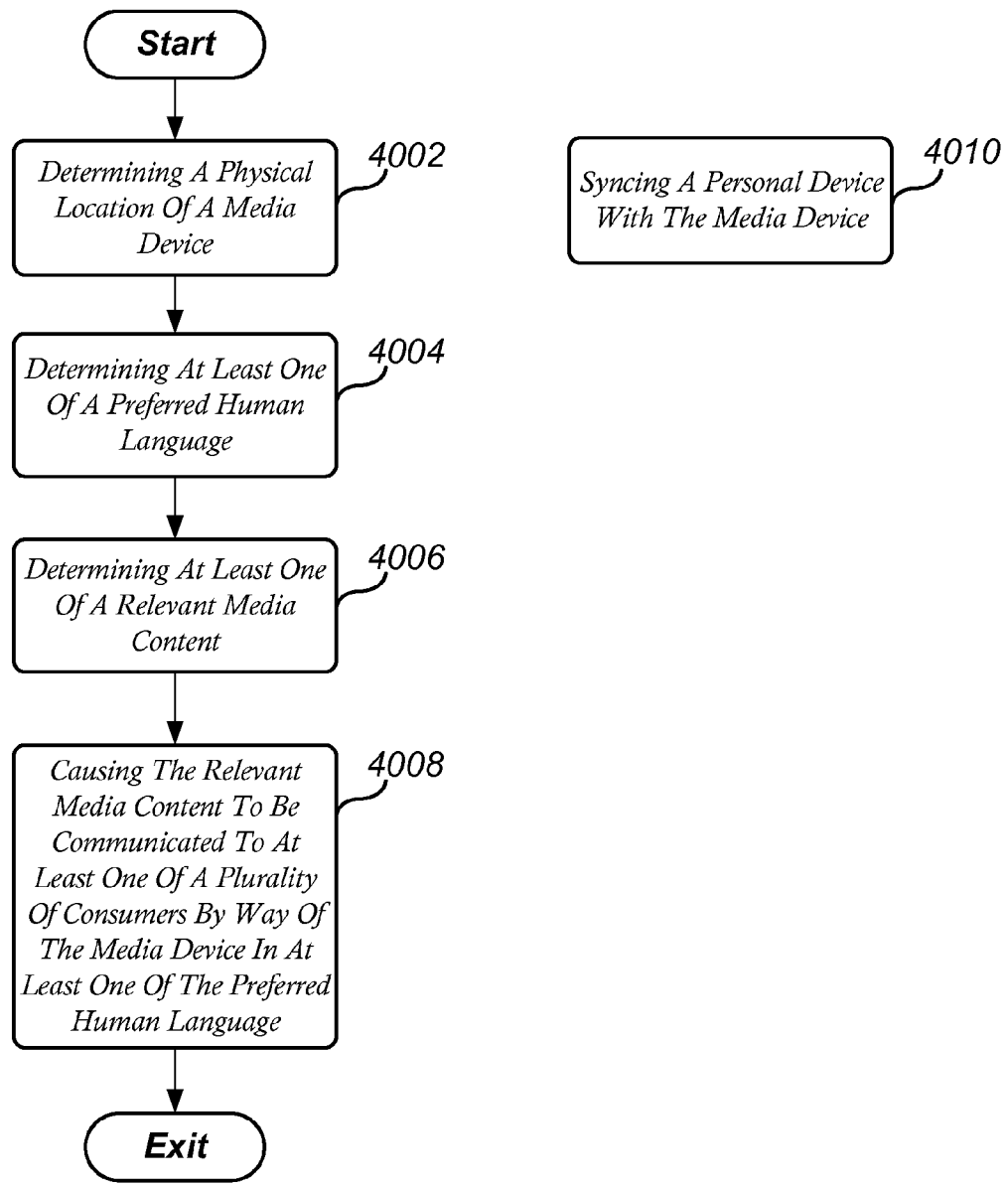

Referring to FIG. 8 there is illustrated one example of a method of increasing the relevance of media content communicated to consumers who are consuming the media content. In an exemplary embodiment, a physical location of a media device 102 and a preferred human language can be determined. At least one relevant media content can also be determined. The relevant media content can be communicated to at least one of a plurality of consumers by way of the media device 102 in at least one of the preferred human languages. The method begins in block 4002.

In block 4002 a physical location of a media device 102 is determined. A physical location of media device 102 and or the personal device 104 can be communicated to a remote server 110 or otherwise used locally by the media device 102 or personal device 104 to select relevant media content based on geographical location, for example and not a limitation, of a transportation vehicle 114 comprising media device 102.

In an embodiment where the physical location of the media device 102 is communicated to a remote server 110, such a communication can be effectuated by way of the media device 102 directly communicating wired or wirelessly with the remote server 110 or the media device 102 can indirectly communicate with the remote server 110 by way of syncing with the personal device 104 and then communicating by way of the personal device 104 with the remote server 110. The method continues in block 4004.

In block 4004 at least one of a preferred human language can be determined. In this regard, the personal device 104, being associated with a consumer 106 can provide or otherwise reference consumer preference information, such as a preferred human language of the consumer 106, and or other preferences. As such, personal device 104 preference data can be directly communicated with the media device 102. Alternatively, such preference data can be indirectly communicated with the media device 102. With regards to indirect data communications, the consumer's preferences may reside on a data processing resource other then the personal device 104, but the personal device 104 can cause the preferences to be communicated with the media device 102, as may be required and or desired in a particular embodiment. The method continues in block 4006.

In block 4006 at least one of relevant media content can be determined. In a plurality of exemplary embodiments, the physical location of the media device 102 and or of the personal device 104 can be utilized with the preferred human language preference and other preferences to select relevant media content. In addition, media content can also be selected based in part on location 112 information, day of week, time of day, consumer occasion, and or other elements or parameters, as may be required and or desired in a particular embodiment. Furthermore, additional criteria such as cultural, ethnic, and other preferences can also be utilized, determined, and or analyzed, along with other parameters to, in part, further identify relevant media content. The method continues in block 4008.

In block 4008 the media device 102 or the media content associated with the media device 102 is caused to be communicated to at least one of the plurality of consumers, in at least one of the preferred human language preferences. In this regard, the personal device 104 interaction by way of syncing with the media device 102 or a server 110 in data communication access with the media device 102 causes the media device 102 or media content associated with the media device 102 to be communicated to the consumer consuming the media content in at least one of the determined optimum preferred human languages. The method in then exited.

Referring to FIG. 8 there are also illustrated exemplary embodiments of a method of increasing the relevance of media content communicated to consumers who are consuming the media content. Such exemplary embodiments can be selectively utilized with the methods of the present invention.

In block 4010 a personal device 104 syncs with a media device 102. Syncing a personal device 104 with a media device 102 can be by way of data communication with the media device 102, by way of a server 110 that has data communication access to the media device 102, or by way of other methods, as may be required and or desired in a particular embodiment.

Figure 9:
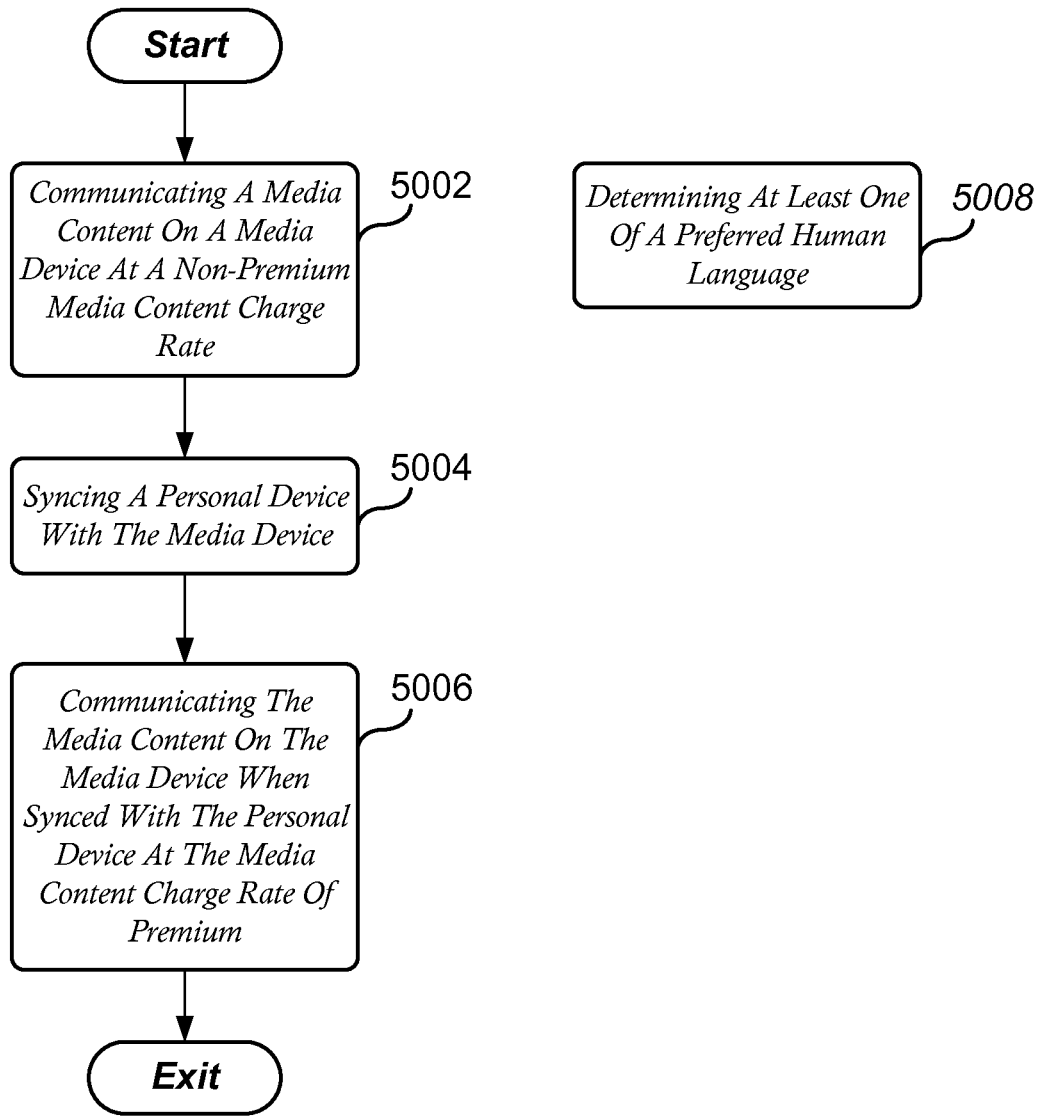

Referring to FIG. 9 there is illustrated one example of a method of increasing the relevance of media content communicated to consumers who are consuming the media content. In an exemplary embodiment, media content is communicated on a media device 102 at a charge rate of non-premium when a personal device 104 is not synced with the media device 102. When the personal device 104 is synced with the media device 102, media content communicated on the media device 102 is charged at a rate of premium. The method begins in block 5002.

In block 5002 a non-premium rate can be charged when the media content is communicated and a personal device 104 is not synced with the media device 102. In an exemplary embodiment, for example and not a limitation, when a personal device 104 is not synced with a media device 102 an advertisement or other media content can be communicated on the media device 102. Since no personal device 104 is synced with the media device 102 the rate charged, to the entity paying for the media content to be communicated on the media device 102, is a non-premium rate. A non-premium rate being less than a premium rate. The method continues in block 5004.

In block 5004 a personal device 104 syncs with a media device 102. Syncing a personal device 104 with a media device 102 can be by way of data communication with the media device 102, by way of a server 110 that has data communication access to the media device 102, or by way of other methods, as may be required and or desired in a particular embodiment. The method continues in block 5006.

In block 5006 a premium rate can be charged when the media content is communicated during a time when at least one of a personal device 104 is synced with the media device. In this embodiment, since a personal device 104 is synced with the media device 102, the media content is more relevant to the consumer 106 who is associated with the personal device 104 and as such a premium is charged to the entity paying for the media content to be communicated on the media device 102, personal device 104, or other devices. The method is then exited.

Referring to FIG. 9 there are also illustrated exemplary embodiments of a method of increasing the relevance of media content communicated to consumers who are consuming the media content. Such exemplary embodiments can be selectively utilized with the methods of the present invention.

In block 5008 at least one of a preferred human language can be determined. In this regard, the personal device 104, being associated with a consumer 106 can provide or otherwise reference consumer preference information, such as the preferred human language of the consumer 106.

Such, personal device 104 preference data can be directly communicated between the personal device 104 and the media device 102. Alternatively, such preference data can be indirectly communicated with the media device 102. With regards to indirect data communications, the consumer's preferences may reside on a data processing resource other then the personal device 104, but the personal device 104 can cause the preferences to be communicated with the media device 102, as may be required and or desired in a particular embodiment.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of increasing the relevance of a media content communicated to consumers who are consuming the media content, the media content being displayed on a media device, the media device being public display advertising signage fixed in a public view location and typically only visually accessible to consumers the method comprising:

associating a consumer with a personal device and the personal device with a human language preference of the consumer;

affixing the media device, in public view, visually accessible by the consumer;

syncing at least one of the personal device with the media device, when the consumer, in possession of the personal device, is within viewable proximity of the media device;

determining at least one of a preferred human language, by way of data communicating the human language preference associated with the personal device synced with the media device or synced with a network resource which manages the media content associated with the media device, preferably the preferred human language being determined based in part on closest match with the human language preference of the consumer; and configuring the media device or the media content associated with the media device to be communicated, to all consumers visually proximate the media device, in at least the preferred human language, wherein communicating the media content in language familiar to the consumer increases the relevance of the media content communicated to the consumer.

2. The method in accordance with claim 1, further comprising:

communicating at least portion of audio or video of the media content on the media device in at least one of the preferred human language.

3. The method in accordance with claim 1, further comprising:

selecting the media content to be presented on the media device based in part on the preferred human language, a culture associated with the preferred human language, or a geography associated with the preferred human language.

4. The method in accordance with claim 1, further comprising:

receiving at least portion of audio or video associated with the media content on the personal device.

5. The method in accordance with claim 1, further comprising:

allowing the consumer to interact with the media content by way of the personal device.

6. The method in accordance with claim 1, further comprising:

transitioning at least portion of audio or video communication of the media content from the media device to the personal device when the personal device is no longer proximate the media device.

7. A method of increasing the relevance of a media content communicated to consumers who are consuming the media content, the media content being displayed on a media device, the media device being public display advertising signage fixed in a public view location and typically only visually accessible to consumers the method comprising:

associating a consumer with a personal device and the personal device with a human language preference of the consumer;

affixing the media device, in public view, visually accessible by the consumer;

allowing more than one of the personal device to sync with the media device, when any of the consumer, in possession of at least one of the personal device, is within viewable proximity of the media device;

analyzing to determine at least one of an optimum preferred human language, at least one of the optimum preferred human language being determined based in part on gathering plurality of the human language preference by data communication then analysis of plurality of the human language preference associated with each of the personal device synced with the media device or synced with a network resource which manages the media content associated with the media device, at least one of the optimum human language selection being based in part on patterns discerned from the human language preference analysis; and causing the media device or the media content associated with the media device to communicate the media content to all consumers visually proximate the media device in at least one of the optimum preferred human language.

8. The method in accordance with claim 7, further comprising:

communicating at least portion of audio or video of the media content on the media device in more than one of the optimum preferred human language to all consumer visually proximate the media device.

9. The method in accordance with claim 7, further comprising:

determining at least one of a secondary preferred human language.

10. The method in accordance with claim 9, further comprising:
communicating the optimum preferred human language in an optimum human language media format; and
communicating the secondary preferred human language in a secondary human language media format.

11. The method in accordance with claim 7, further comprising:
receiving at least portion of the media content on an in-vehicle media system.

12. A method of increasing the relevance of a media content communicated to consumers who are consuming the media content, the media content being displayed on a media device, the media device being public display advertising signage fixed in a public view location and typically only visually accessible to consumers, the method comprising:
associating a consumer with a personal device and the personal device with a human language preference of the consumer:
affixing the media device, in public view, visually accessible by the consumer;
syncing the personal device with the media device, when the consumer, in possession of the personal device, is within viewable proximity of the media device;
determining a preferred human language, by way of data communicating the human language preference associated with the personal device synced with the media device or synced with a network resource which manages the media content associated with the media device, preferably the preferred human language being determined based in part on closest match with the human language preference of the consumer; and
communicating at least portion of audio or video of the media content in the preferred human language, on the media device, to all consumers visually proximate the media device, wherein communicating the media content in the preferred human language increases relevance of the media content with the consumer.

13. The method in accordance with claim 12, further comprising:
charging a non-premium rate when the media content is not communicated in the preferred human language; and
charging a premium rate when the media content is communicated in the preferred human language.

14. The method in accordance with claim 12, further comprising:
charging a premium rate when the media content is communicated in the preferred human language.

15. The method in accordance with claim 12, further comprising:
receiving at least portion of audio or video associated with the media content on the personal device.

16. The method in accordance with claim 12, further comprising:
allowing the consumer to interact with the media content by way of the personal device.

17. The method in accordance with claim 12, wherein syncing further comprising syncing with a server associated with the media device.

18. A method of increasing the relevance of a media content communicated to consumers who are consuming the media content, the media content being displayed on a media device, the media device being public display advertising signage fixed in a public view location and typically only visually accessible to consumers, the method comprising:
associating each of a plurality of consumers with a personal device and the personal device with a human language preference;
affixing the media device, in public view, visually accessible by at least some of the plurality of consumers;
determining at least one of a preferred human language of at least one of the plurality of consumers proximate the media device, by way of data communicating the human language preference associated with the personal device proximate the media device, preferably the preferred human language being determined based in part on closest match with the human language preference of the consumer;
determining at least one of a relevant media content based on at least the physical location of the media device; and
causing the relevant media content to be communicated by way of the media device, in at least one of the preferred human language, to all consumers visually proximate the media device.

19. The method in accordance with claim 18, further comprising:
syncing the personal device with the media device, when the consumer, in possession of the personal device, is within viewable proximity of the media device.

20. The method in accordance with claim 19, wherein syncing further comprising:
communicating data between the personal device and a server, the server having data communication access with the media device.

21. The method in accordance with claim 19, wherein syncing further comprising:
communicating data between the personal device and the media device.

22. A method of increasing the relevance of a media content communicated to consumers who are consuming the media content, the media content being displayed on a media device, the media device being public display advertising signage fixed in a public view location and typically only visually accessible to consumers, the method comprising:
associating a consumer with a personal device and the personal device with a human language preference of the consumer;
affixing the media device, in public view, visually accessible by the consumer;
communicating, when not synced with the personal device, the media content on the media device at a media content charge rate of non-premium, to all consumers visually proximate the media device;
syncing at least one of the personal device with the media device, when the consumer, in possession of the personal device, is within viewable proximity of the media device; and
communicating the media content on the media device, when synced with the personal device, at the media content charge rate of premium, to all consumers visually proximate the media device.

23. The method in accordance with claim 22, further comprising:
determining a preferred human language, by way of data communicating the human language preference associated with the personal device synced with the media device or synced with a network resource which manages the media content associated with the media device, preferably the preferred human language being determined based in part on closest match with the human language preference of the consumer.

24. A personal device for increasing the relevance of a media content communicated to consumers who are consuming the media content, the media content being displayed on a media device, the media device being public display advertising signage typically only visually accessible to consumers, the personal device comprising:
- a means for syncing with at least one of a media device, when a consumer, in possession of a personal device, is within viewable proximity of the media device; and
- a computer readable medium encoded with instructions for associating the consumer with the personal device and the personal device with a human language preference of the consumer; causing wirelessly the human language preference to be communicated, by way of the means for syncing, to the media device;
- wherein the media device is affixed in public view, visually accessible by the consumer and a preferred human language is determined, by way of data communicating the human language preference associated with the personal device synced with the media device or synced with a network resource which manages the media content associated with the media device, preferably the preferred human language being determined based in part on closest match with the human language preference of the consumer;
- wherein the media device or the media content associated with the media device is configured or caused to be communicated in the preferred human language, to all consumers visually proximate the media device, to increase relevance of the media content communicated to the consumer.

25. The personal device in accordance with claim 24, further comprising:
- a wireless control means and the computer readable medium encoded with instructions for using the wireless control means to perform data entry on the media device, and controlling interaction with media content associated with the media device.

26. The personal device in accordance with claim 24, further comprising:
- a means for interacting with at least a portion of the media content and the computer readable medium encoded with instructions for receiving and displaying at least a portion of the media content on the personal device, and engendering the consumer to interact with at least a portion of the media content on the personal device.

* * * * *